United States Patent [19]

Weman

[11] 3,926,384
[45] Dec. 16, 1975

[54] LOCKING MECHANISM FOR AUTOMOBILE SAFETY BELT RETRACTOR

[76] Inventor: Per Olof Weman, Alber Kirchweg 85, 2081 Haslah, Germany

[22] Filed: July 26, 1973

[21] Appl. No.: 382,971

[52] U.S. Cl. .............................................. 242/107.4
[51] Int. Cl.² .................... A62B 35/02; B65H 75/48
[58] Field of Search ............ 242/107.4; 280/150 SB; 297/388

[56] References Cited
UNITED STATES PATENTS

| | | | |
|---|---|---|---|
| 3,430,891 | 3/1969 | Burleigh | 242/107.4 |
| 3,741,494 | 6/1973 | Fiala | 242/107.4 |
| 3,758,044 | 9/1973 | Nilsson | 242/107.4 |
| 3,770,224 | 11/1973 | Hayashi | 242/107.4 |
| 3,790,098 | 2/1974 | Lewis | 242/107.4 |

*Primary Examiner*—John W. Huckert
*Assistant Examiner*—John M. Jillions
*Attorney, Agent, or Firm*—John P. Kirby, Jr.

[57] ABSTRACT

The locking mechanism is operated by inertia and prevents withdrawal of an automobile safety seat belt from its retractor when the locking mechanism is subjected to a predetermined acceleration or deceleration, or a sudden change in direction of movement. The locking mechanism uses an inertia member, such as a sphere, disposed on a retaining base. A substantially conical member is disposed over the inertia member and a locking dog is affixed to the substantially conical member. The inertia member is adapted to be disposed in a rest position in the approximate center of the retaining base and is adapted to be displaced from the rest position by inertia to an engaged position at the periphery of the locking dog retaining base, which causes the locking dog to engage a ratchet wheel axially mounted on the safety belt spool to restrain the safety belt against withdrawal. The upper surface of the retaining base may be substantially flat or may have a slightly convex shape. A magnetic material may be positioned in the central portion of the retaining base to exert a force large enough to hold the inertia member in the central position prior to actuation of the locking mechanism. The retaining base may also have a shallow recess at the center of the retaining base to hold the inertia member in the rest position.

8 Claims, 7 Drawing Figures

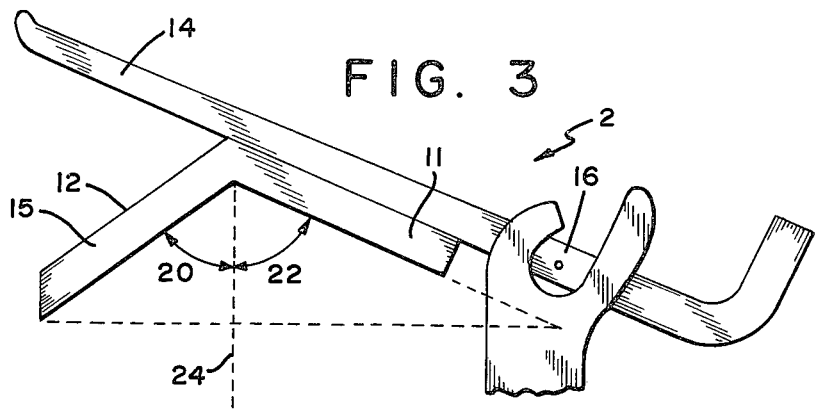
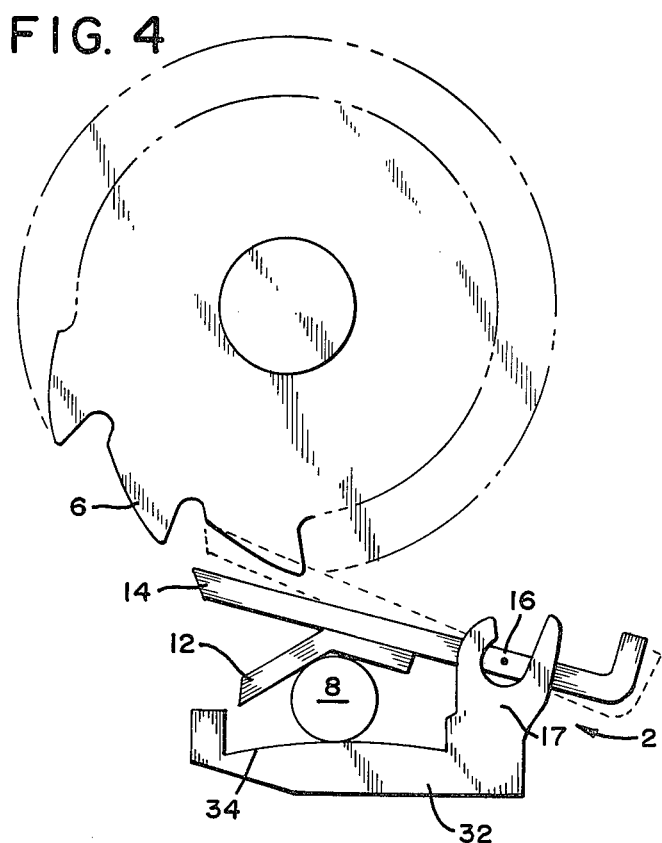
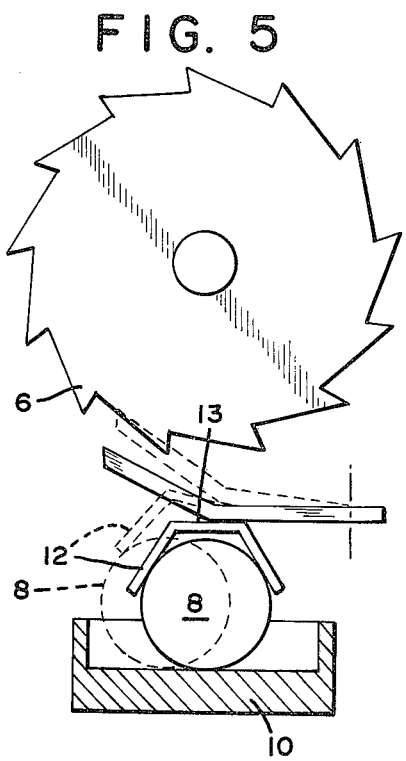
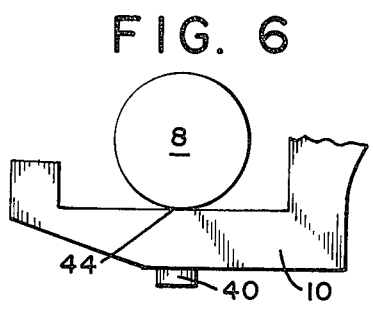
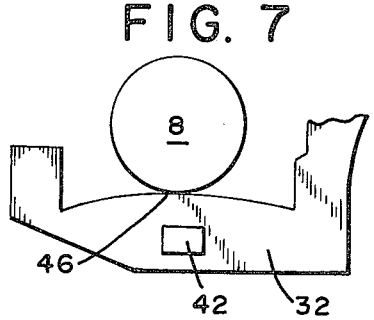

LOCKING MECHANISM FOR AUTOMOBILE SAFETY BELT RETRACTOR

BACKGROUND OF THE INVENTION

This invention relates to safety belts, such as those adapted for use in vehicles, such as an automobile. More particularly, this invention relates to an improved locking mechanism for the retractor mechanism of such a safety belt. The locking mechanism is adapted to be placed in operation automatically when a dangerous situation arises, such as a collision. Still more particularly, this invention relates to an improved locking mechanism operated by inertia and adapted to lock the withdrawal mechanism of the safety belt when the locking mechanism is subjected to a predetermined deceleration or acceleration or to a sudden change in the direction of movement, such as occurs in dangerous situations, such as a collision.

Recently designed automobile safety seat belts are normally wound on a spool and are equipped with a retractor mechanism. When the seat belt is in use under normal conditions, not under emergency conditions, it is possible for the seat belt wearer to move in his seat, for example, to lean forward. As the wearer leans forward, the belt is unwound from the spool, and as the wearer leans back, the belt is retracted and rewound on the spool. But, in an emergency, it is desirable to lock the spool so that it will not allow the belt to be unwound, but, rather, will hold the wearer firmly in his seat.

Other locking mechanisms for a safety belt are known in the prior art, including locking mechanisms operated by inertia, such as those disclosed in U.S. Pat. Nos. 3,237,729 to Proctor; 3,430,891 to Burleigh; 3,343,763 to Spouge and 3,343,765 to Baker; all of which disclose mono-stable mechanisms. Another patent of interest is U.S. Pat. No. 1,044,228 to Myers.

SUMMARY OF THE INVENTION

The object of this invention is to provide a locking mechanism of improved and simple design for a safety belt. Another object of this invention is to provide an improved locking mechanism which achieves a more positive locking action. Still another object of this invention is to provide a locking mechanism which has two substantially stable positions, a rest position in which the locking mechanism is not engaged, and an engaged position in which the locking mechanism is engaged and restrains the safety belt against movement in the withdrawal direction.

The locking mechanism of this invention comprises; an inertia member adapted to be disposed in a rest position when the locking mechanism is inoperative and adapted to be displaced from the rest position by inertia; a retaining base for this inertia member on which the inertia member is supported; a substantially conical member disposed above the inertia member and centered over the rest position of the inertia member; and a locking dog affixed to the substantially conical member, whereby displacement of the inertia member from the rest position causes the locking dog to engage the ratchet wheel which is mounted on the spool and thus restrains the safety belt against movement in the withdrawal direction. The substantially conical member is slightly tilted. In one embodiment of this invention, the retaining base has a substantially flat upper surface. In a second embodiment of this invention, the retaining base has a slightly convex upper surface. In a third embodiment of this invention, a magnetic material is positioned in the center portion of the retaining base and the inertia member is composed of a magnetic material. The magnetic force of the magnetic material is large enough to hold the inertia member in the central position prior to actuation of the locking mechanism. The retaining base may have a shallow recess at its center adapted to hold the inertia member in a rest position prior to actuation.

DESCRIPTION OF THE DRAWINGS

FIG. 3 is an enlarged schematic illustration of a portion of the locking mechanism shown in FIG. 1.

FIG. 4 is a schematic illustration of an alternate embodiment of the locking mechanism.

FIG. 5 is a schematic illustration of another alternate embodiment of the locking mechanism.

FIG. 6 is a schematic illustration of a portion of the locking mechanism showing another alternate embodiment.

FIG. 7 is a schematic illustration of a portion of the locking mechanism showing another alternate embodiment.

DETAILED DESCRIPTION

Figure 1:
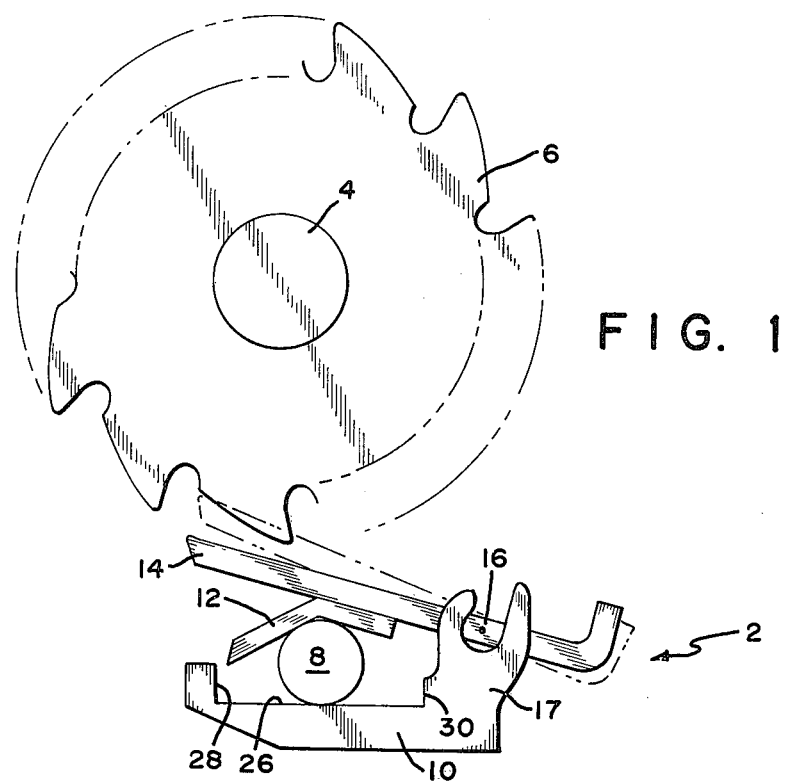
FIG. 1 is a schematic illustration of the locking mechanism of this invention in its rest position.

Referring to FIG. 1, the locking mechanism of this invention is generally indicated by the numeral 2 and is adapted for use with one or more safety belts, such as those used in automobiles and other vehicles. The locking mechanism 2 is adapted for use with safety belts of the type which are wound around a spool 4. The spool has one or more ratchet wheels 6 which are axially mounted on the spool 4 as part of the retractor mechanism. A safety belt having such a spool and ratchet wheel mechanism is described in U.S. Pat. No. 3,343,765 to A. R. Baker and in U.S. Pat. No. 3,226,053 to J. W. L. Petty. The locking mechanism 2 comprises: an inertia member 8 adapted to be disposed in a rest position, as shown in FIG. 1, when the locking mechanism 2 is inoperative and adapted to be displaced from this rest position by inertia, as shown in FIG. 2; a retaining base 10 for the inertia member 8, the inertia member 8 being supported on the retaining base 10; a substantially conical member 12 having an open bottom disposed above the inertia member 8, in contact with a portion of the top of the inertia member 8 and centered over the rest position of the inertia member 8, as illustrated in FIG. 1; and a locking dog 14 affixed to the substantially conical member 12, whereby displacement of the inertia member 8 from the rest position, as shown in FIG. 1, causes the locking dog 14 to engage the ratchet wheel 6, as shown in FIG. 2, to restrain the safety belt against movement in the withdrawal direction.

Figure 2:
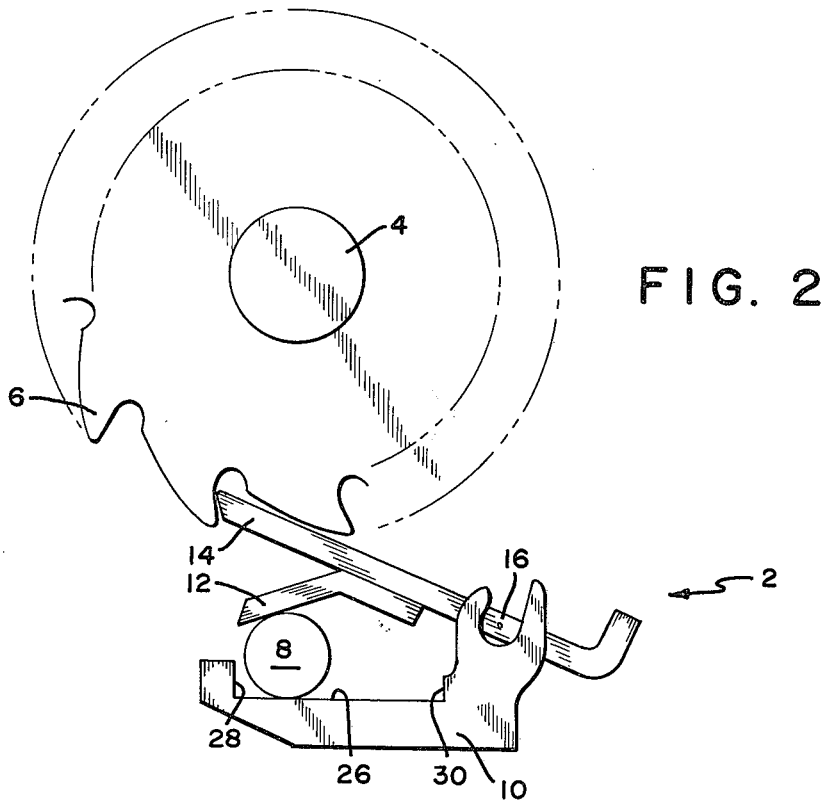
FIG. 2 is a schematic illustration of the locking mechanism shown in FIG. 1, but in FIG. 2 the locking mechanism is shown in its engaged position.

The locking mechanism 2 has two substantially stable positions, a rest position, when the inertia member 8 is located in the approximate center of the retaining base 10, which is illustrated in FIG. 1, and an engaged position, when the inertia member 8 is located at the periphery of the retaining base 10, as illustrated in FIG. 2. When the vehicle in which the locking mechanism 2 is positioned is subjected to a sudden acceleration or deceleration or change in direction of movement of a predetermined magnitude, the inertia member 8 will move from its approximate center position, shown in FIG. 1, to the outer periphery of the retaining base 10, shown in FIG. 2. This provides a binary effect in which the inertia member 8 has two substantially stable positions, a rest position when the inertia member 8 is located in the approximate center of the retaining base 10 and engaged position when the inertia member is located at the periphery of the retaining base 10.

The inertia member 8 returns to the rest position, in the approximate center of the retaining base 10, as a result of the weight of the substantially conical member 12 and the locking dog 14 on the inertia member 8.

The inertia member 8 may be substantially spherical and will move in a direction opposite to that of the vehicle. If the vehicle accelerates, the inertia member 8 will move in a direction toward the back of the vehicle. If the vehicle decelerates, the inertia member 8 will move in a direction toward the front of the vehicle. If the vehicle turns to the right, the inertia member 8 will move to the left. If the vehicle turns to the left, the inertia member 8 will move to the right.

Movement of the inertia member 8 from its center position, shown in FIG. 1, to the outer periphery of the retaining base 10, shown in FIG. 2, causes one side of the substantially conical member 12 to move upward and, as a result, causes the locking dog 14 to move upward. The locking dog pivots on pivot point 16. Upward movement of the locking dog 14, causes the locking dog 14 to engage an outer ratchet tooth of ratchet wheel 6. In FIGS. 1 and 2, the counterclockwise direction of the ratchet wheel 6 is the direction in which the ratchet wheel turns when the safety belt is being withdrawn.

Referring to FIG. 3, the substantially conical member 12 is slightly tilted in reference to vertical plane 24 for the purpose of providing uniform sensitivity for the engaging action of the locking dog 14 to the ratchet wheel 6. Referring to FIGS. 1 and 2, the locking dog 14 engages the ratchet wheel 6 at one end of the locking dog 14. The locking dog 14 has a pivot point 16 at the opposite end of the locking dog 14 from the end which engages the ratchet wheel 6. The pivot point 16 is part of a support member 17 which may be connected to retaining base 10. Referring to FIG. 3, the angle 22 is formed by the side 11 of the substantially conical member 12 adjacent to the end of the locking dog 14 having pivot point 16 with the vertical plane 24. The angle 20 is formed by the side 15 of the substantially conical member 12 adjacent the end of the locking dog 14 which engages the ratchet wheel 6 with the vertical plane 24. Angle 22 is greater than angle 20 because of the tilt of the substantially conical member 12. Angle 20 may be an angle in the range of from 56 degrees to 59 degrees, such as 57.5 degrees. Angle 22 may be an angle in the range of from 61 degrees to 64 degrees, such as 62.5 degrees. These angles vary with the geometry of the system, that is, the relationship of the pivot point 16 of the locking dog 14 to the location and size of the inertia member 8. Optionally, the side 11 of the substantially concial member 12 adjacent to the end of the locking dog 14 having pivot point 16 may be slightly shorter than the side 15 of the substantially conical member 12 adjacent to the end of the locking dog 14 which engages the ratchet wheel 6.

Referring to FIGS. 1 and 2, in the first and preferred embodiment of this invention, the retaining base 10 has a substantially flat upper surface 26 disposed in an approximately horizontal position and has upturned edges 28 and 30 at the outer periphery of the retaining base 10.

Referring to FIG. 4, a second embodiment of this invention has a retaining base 32 which has a slightly convex upper surface disposed in an approximately horizontal position and has upturned edges 28 and 30 at the outer periphery of the base 32. The slightly convex upper surface 34 accentuates the positive locking action of this locking mechanism 2. Once the inertia member 8 starts to move away from the approximate center of retaining base 32, the displacement is amplified somewhat by the convex shape of the surface 34. This produces a binary effect in which the inertia member 8 has two substantially stable positions, a rest position when the inertia member 8 is located in the approximate center of the retaining base 32 and engaged position when the inertia member is located at the periphery of the retaining base 32. As a result of this design, illustrated in FIG. 4, the movement of the locking mechanism 2 from the rest position to the engaged position is more rapid than when the upper surface 34 is flat.

Referring to FIG. 5, the substantially conical member 12 may optionally have a flatten portion at its apex 13 whereby it approaches the shape of an inverted cup.

Referring to FIG. 6, the third embodiment of this invention has a magnet or a magnetic material 40 located at the center of the retaining base 10, shown in FIG. 1, or the retaining base 32, and located on the underside of the retaining base, as shown in FIG. 6. The magnetic force of the magnet or the magnetic material 40 is large enough to hold the inertia member 8 in the central position of the retaining base 10 prior to actuation of the locking mechanism 2 and small enough to be overcome by an accelerating or decelerating force. For this embodiment, the inertia member 8 is composed of a magnetic material.

Referring to FIG. 7, the magnet or a magnetic material 42 is located at the center of the retaining base 32, shown in FIG. 4, or the retaining base 10, shown in FIG. 1, and the magnetic material 40 or 42 is imbedded within the retaining base 32.

Such a magnet or magnetic material 40 or 42 may be used with the embodiment of FIG. 1 having a substantially flat upper surface or the embodiment of FIG. 4 having a slightly convex upper surface. The magnet 40 or 42 further establishes a stable position for the inertia member 8 at the center of a retaining base 10 and 32.

Referring to FIGS. 6 and 7, the upper surface of the retaining base 10 may optionally have a shallow recess at the center of the retaining base 10 into which the inertia member 8 fits while in rest position. The recess 44 is shallow enough so that the inertia member 8 may be displaced out of the recess 44 upon acceleration or deceleration.

What is claimed is:

1. A locking mechanism operated by inertia and adpated for use with one or more safety belts of the type wherein the safety belt is wound around a spool, said spool having one or more ratchet wheels connected thereto, said locking mechanism comprising:
    an inertia member adapted to be disposed in a rest position when said locking mechanism is inoperative and adapted to be displaced from said rest position by inertia;

a retaining base for said inertia member, said inertia member being supported on said retaining base;

a substantially conical actuation member having an open bottom, sides and a top, said actuation member disposed above said inertia member and centered over said rest position of said inertia member, said actuation member movable by said inertia member; and a locking dog affixed to said actuation member, whereby displacement of said inertia member from said rest position causes said locking dog to engage said ratchet wheel to restrain said safety belt against movement in the withdrawal direction; wherein:

at least a portion of said inertia member extends into said open bottom of said actuation member, a portion of said sides of said actuation member extending at least partially over and around at least a portion of said inertia member;

said locking dog engages said ratchet wheel at one end of said locking dog and said locking dog has a pivot point at the opposite end of said locking dog from the end which engages said ratchet wheel, said actuation member affixed between said ends of said locking dog; and said actuation member is slightly tilted, thereby providing uniform sensitivity to the engaging action of the locking dog to the ratchet wheel; and the angle formed by the side of said actuation member adjacent the end of said locking dog having said pivot point with a vertical plane through the top of said actuation member being greater than the angle formed by the side of said actuation member adjacent the end of said locking dog which engages said ratchet wheel with the vertical plane.

2. A locking mechanism according to claim 1 wherein said retaining base has a substantially flat upper surface disposed in a substantially horizontal position and has upturned edges at the outer periphery of said base.

3. A locking mechanism according to claim 1 wherein said retaining base has a slightly convex upper surface disposed in a substantially horizontal position and has upturned edges at the outer periphery of said base.

4. A locking mechanism according the claim 1 and further comprising a magnet located at the center of said base, the magnetic force of which is large enough to hold said inertia member in the central position of said base prior to actuation of said locking mechanism; and wherein said inertia member is composed of a magnetic material.

5. A locking mechanism according to claim 1 wherein said retaining base has an upper surface and said upper surface has a shallow recess at the center of said retaining base adapted to hold said inertia member in said rest position and adapted to allow said inertia member to be displaced out of said recess by inertia.

6. A locking mechanism according to claim 1 wherein said actuation member is in contact with a portion of the top of said inertia member.

7. A locking mechanism according to claim 1 wherein said actuation member has a flattened portion at its top.

8. A locking mechanism according to claim 1 wherein the side of the actuation member adjacent to the end of the locking dog having the pivot point is slightly shorter than the side of the actuation member adjacent to the end of the locking dog which engages the ratchet wheel.

* * * * *